US011135879B2

United States Patent
Koishikawa (10) Patent No.: US 11,135,879 B2
(45) Date of Patent: Oct. 5, 2021

(54) PNEUMATIC TIRE (71) Applicant: The Yokohama Rubber Co., LTD., Tokyo (JP)

(72) Inventor: Yoshifumi Koishikawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 124 days.

(21) Appl. No.: 14/904,675

(22) PCT Filed: Jul. 2, 2014

(86) PCT No.: PCT/JP2014/067682
§ 371 (c)(1),
(2) Date: Jan. 12, 2016

(87) PCT Pub. No.: WO2015/005194
PCT Pub. Date: Jan. 15, 2015

(65) Prior Publication Data
US 2016/0144665 A1 May 26, 2016

(30) Foreign Application Priority Data
Jul. 12, 2013 (JP) .............................. JP2013-146758

(51) Int. Cl.
B60C 11/03 (2006.01)
B60C 11/12 (2006.01)

(52) U.S. Cl.
CPC ...... B60C 11/0327 (2013.01); B60C 11/0302 (2013.01); B60C 11/0304 (2013.01);
(Continued)

(58) Field of Classification Search
CPC ... B60C 11/0327; B60C 11/03; B60C 11/033; B60C 11/0332; B60C 11/0304;
(Continued)

(56) References Cited

U.S. PATENT DOCUMENTS 4,299,264 A * 11/1981 Williams ............ B60C 11/0302
152/209.18
7,207,364 B2 * 4/2007 Hildebrand ......... B60C 11/0306
152/209.18
(Continued)

FOREIGN PATENT DOCUMENTS

CN 101456337 6/2009
CN 101678722 3/2010
(Continued)

OTHER PUBLICATIONS

An online publication by Nicola D'Este, published on Mar. 16, 2013. Retrieved from the Internet on May 4, 2017: <URL=https://www.gommeblog.it/pneumatici/40134/nexen-nfera-su1/>.*
(Continued)

Primary Examiner — Xiao S Zhao
Assistant Examiner — Nicholas R Krasnow
(74) Attorney, Agent, or Firm — Thorpe North & Western (57) ABSTRACT A pneumatic tire comprises at least four main grooves extending in the tire circumferential direction on the tread surface, circumferential land portions and shoulder land portions partitioned and formed by these main grooves, and designation of a mounting direction with respect to a vehicle, wherein a plurality of lug grooves is formed at intervals in the tire circumferential direction in each of the plurality of circumferential land portions, extending in the tire width direction, communicating with the main groove on the vehicle inner side, not communicating with the main groove on the vehicle outer side, and terminating within the circumferential land portion.

18 Claims, 5 Drawing Sheets (52) U.S. Cl.
CPC ......... *B60C 11/0306* (2013.01); *B60C 11/12* (2013.01); *B60C 2011/0341* (2013.01); *B60C 2011/0348* (2013.01); *B60C 2011/0351* (2013.01); *B60C 2011/0381* (2013.01); *B60C 2011/0383* (2013.01); *B60C 2011/0388* (2013.01); *B60C 2011/0393* (2013.01); *B60C 2011/1209* (2013.01)

(58) Field of Classification Search
CPC ..... B60C 2011/0381; B60C 2011/0393; B60C 2011/0395
See application file for complete search history.

(56) References Cited

U.S. PATENT DOCUMENTS

| | | | | |
|---|---|---|---|---|
| 2008/0236714 | A1* | 10/2008 | Kojima | B60C 11/0332 |
| | | | | 152/209.9 |
| 2009/0114324 | A1* | 5/2009 | Ohki | B60C 11/1323 |
| | | | | 152/209.23 |
| 2009/0151832 | A1 | 6/2009 | Miyoshi et al. | |
| 2009/0320981 | A1* | 12/2009 | Matsumoto | B60C 11/0306 |
| | | | | 152/209.8 |
| 2010/0116392 | A1 | 5/2010 | Yamakawa | |
| 2010/0212792 | A1* | 8/2010 | Mita | B60C 11/0306 |
| | | | | 152/209.9 |
| 2010/0263775 | A1 | 10/2010 | Watanabe | |
| 2012/0285592 | A1 | 11/2012 | Kameda | |
| 2012/0298269 | A1* | 11/2012 | Mathonet | B60C 11/0306 |
| | | | | 152/209.16 |
| 2014/0238566 | A1* | 8/2014 | Takahashi | B60C 11/1236 |
| | | | | 152/209.8 |
| 2014/0290815 | A1* | 10/2014 | Tomida | B60C 11/1236 |
| | | | | 152/209.18 |

FOREIGN PATENT DOCUMENTS

| | | | | |
|---|---|---|---|---|
| CN | 101890881 | | 11/2010 | |
| DE | 102013005994 | A1 * | 10/2013 | ......... B60C 11/1323 |
| JP | S60-018003 | | 2/1985 | |
| JP | 2009-143327 | | 7/2009 | |
| JP | 2010-215221 | | 9/2010 | |
| JP | 2010-247759 | | 11/2010 | |
| JP | 2012-236455 | | 12/2012 | |
| WO | WO 2008/096498 | | 8/2008 | |
| WO | WO 2008/152996 | | 12/2008 | |
| WO | WO-2013015346 | A1 * | 1/2013 | ............. B60C 11/04 |

OTHER PUBLICATIONS

V105—http://www.tyrereviews.co.uk/Tyre/Yokohama/Advan-Sport-V105.htm (Year: 2013).*
V103—http://lovetyres.com/tyre/Yokohama-V103-ADVAN-Sport (Year: 2012).*
International Search Report for International Application No. PCT/JP2014/067682 dated Sep. 22, 2014, 4 pages, Japan.

* cited by examiner

PNEUMATIC TIRE

TECHNICAL FIELD

The present technology relates to a pneumatic tire having at least four main grooves extending in a tire circumferential direction on a tread surface, and more particularly relates to a pneumatic tire with improved noise performance while achieving both steering stability performance on dry road surfaces and traveling performance on wet road surfaces.

BACKGROUND

In recent years, with advances in road maintenance and enhanced performance of vehicles, there is a strong demand for improvement of pneumatic tires in noise performance while achieving both traveling performance on dry road surfaces (dry performance) and traveling performance on wet road surfaces (wet performance) when traveling at high speeds.

Ensuring drainage by forming, on the tread surface of tires, main grooves extending in the tire circumferential direction as well as lug grooves and sipes extending in a tire width direction is normally performed as a method for improving wet performance. However, there is a problem that it becomes difficult to ensure dry performance by such a method since the rigidity of land portions formed on the tread surface decreases, and moreover there is also a problem that this decrease in rigidity simultaneously results in the deterioration of noise performance.

Conventionally, as a measure to improve the noise performance while achieving both the dry performance and wet performance, it has been proposed that a mounting direction of the tire on the vehicle be designated, and the shape and position of lug grooves be specified (for example, see Japanese Unexamined Patent Application Publication No. 2010-247759A).

However, in the structure of Japanese Unexamined Patent Application Publication No. 2010-247759A, there are land portions where lug grooves are not formed, so it may not be possible to obtain sufficient wet performance. Also, although it is possible to ensure the rigidity of the land portions by providing few lug grooves, the feeling of responsiveness during steering and the linearity of steering (linearity of the vehicle behavior with respect to the steering angle during steering) caused by the lug grooves are insufficient, so it becomes difficult to sufficiently improve the dry performance, in particular to improve the steering stability on dry road surfaces (dry steering stability). Therefore, there is a demand for further improvement in the enhancement of noise performance while achieving both dry performance and wet performance.

SUMMARY

The present technology provides a pneumatic tire with improved noise performance while achieving both steering stability performance on dry road surfaces and traveling performance on wet road surfaces.

A pneumatic tire according to the present technology is a pneumatic tire including at least 4 main grooves extending in a tire circumferential direction on a tread surface, a plurality of circumferential land portions partitioned and formed extending in the tire circumferential direction between adjacent main grooves, shoulder land portions partitioned and formed between the main grooves on outermost sides in a tire width direction and ground contact edges on both sides in the tire width direction, and designation of a mounting direction with respect to a vehicle; wherein a plurality of lug grooves is formed at intervals in the tire circumferential direction in each of the plurality of circumferential land portions, extending in the tire width direction, communicating with the main groove on the inner side with respect to the vehicle when mounted on the vehicle, not communicating with the main groove on the outer side with respect to the vehicle when mounted on the vehicle, and terminating within the circumferential land portion.

In the present technology, as described above, since each of the lug grooves formed in the circumferential land portions opens to the main groove on the inner side with respect to the vehicle when mounted on the vehicle, and do not open to the main groove on the outer side with respect to the vehicle when mounted on the vehicle, the popping sound and pattern noise during traveling are radiated toward the inner side with respect to the vehicle, so it is possible to reduce external noise. Also, since the lug grooves as described above are formed in all of the circumferential land portions, during traveling on wet road surfaces, rainwater and the like interposed between the land portions and the road surface easily and efficiently flow toward the main grooves on vehicle inner side, so it is possible to improve the wet performance. On the other hand, each of the lug grooves terminates within the circumferential land portions, and do not divide the circumferential land portions, so the rigidity of each of the circumferential land portions is ensured, and it is possible to maintain the dry performance.

In the present technology, preferably, only the lug grooves are formed in the circumferential land portions. By this, it is possible to reliably reduce external noise.

In the present technology, preferably, at least in the shoulder land portion on the outer side with respect to the vehicle when mounted on the vehicle, a circumferential narrow groove is formed extending in the tire circumferential direction and shoulder lug grooves are formed at intervals in the tire circumferential direction extending in the tire width direction, opening to the circumferential narrow groove and the ground contact edge, and not opening to the main groove. As a result, air column resonance caused by the main grooves is not radiated to the outside of the vehicle through the shoulder lug grooves, and the groove cross-sectional area of the circumferential narrow groove is small, so air column resonance caused by the circumferential narrow groove is sufficiently small, and it is possible to suppress external noise. Also, during traveling on wet road surfaces, rainwater and the like interposed between the land portion and the road surface can be discharged by the circumferential narrow groove and the shoulder lug grooves, so it is possible to improve the wet performance. On the other hand, the land portion is partitioned and formed without being divided in the circumferential direction between the circumferential narrow grooves and the main groove adjacent to the circumferential narrow groove, so the rigidity of this portion is ensured, and it is possible to improve the dry performance.

In the present technology, preferably, the groove area ratio of the circumferential land portions on the outer side in the tire width direction is greater than the groove area ratio of the circumferential land portion on the tire equator side, and, the groove area ratio of the shoulder land portions is greater than the groove area ratio of the circumferential land portions on the outermost side in the tire width direction. By setting the groove area ratio in this way, it is possible to suppress the increase in sudden cornering force and achieve smoother steering, in other words, it is possible to improve the linearity of steering.

In the present technology, preferably, in the shoulder land portions on both sides in the tire width direction, circumferential narrow grooves are formed extending in the tire circumferential direction and shoulder lug grooves are formed at intervals in the tire circumferential direction extending in the tire width direction, opening to the circumferential narrow groove and the ground contact edge, and not opening to the main groove; and sipes are formed at least on the shoulder land portion on the inner side with respect to the vehicle when mounted on the vehicle, extending in the tire width direction, opening to the circumferential narrow groove and the ground contact edge, and not opening to the main groove. By providing sipes in this way, water drainage performance can be obtained by the sipes, so it is possible to improve the wet performance.

In the present technology, preferably, each of the lug grooves is inclined in the same direction with respect to the tire circumferential direction. By arranging the lug grooves in this manner, the flow of water is smooth through the lug grooves when traveling on road surfaces on which the water depth is deep and the like, so the water drainage performance is improved, and it is possible to improve the wet performance.

In this case, preferably, the shoulder lug grooves are also inclined in the same direction as the lug grooves. By arranging the shoulder lug grooves in this manner, the flow of water is smooth through the lug grooves and the shoulder lug grooves when traveling on road surfaces on which the water depth is deep and the like, so the water drainage performance is improved, and it is possible to improve the wet performance.

DETAILED DESCRIPTION

The following is a detailed description of the configuration of the present technology with reference to the accompanying drawings.

Figure 1:
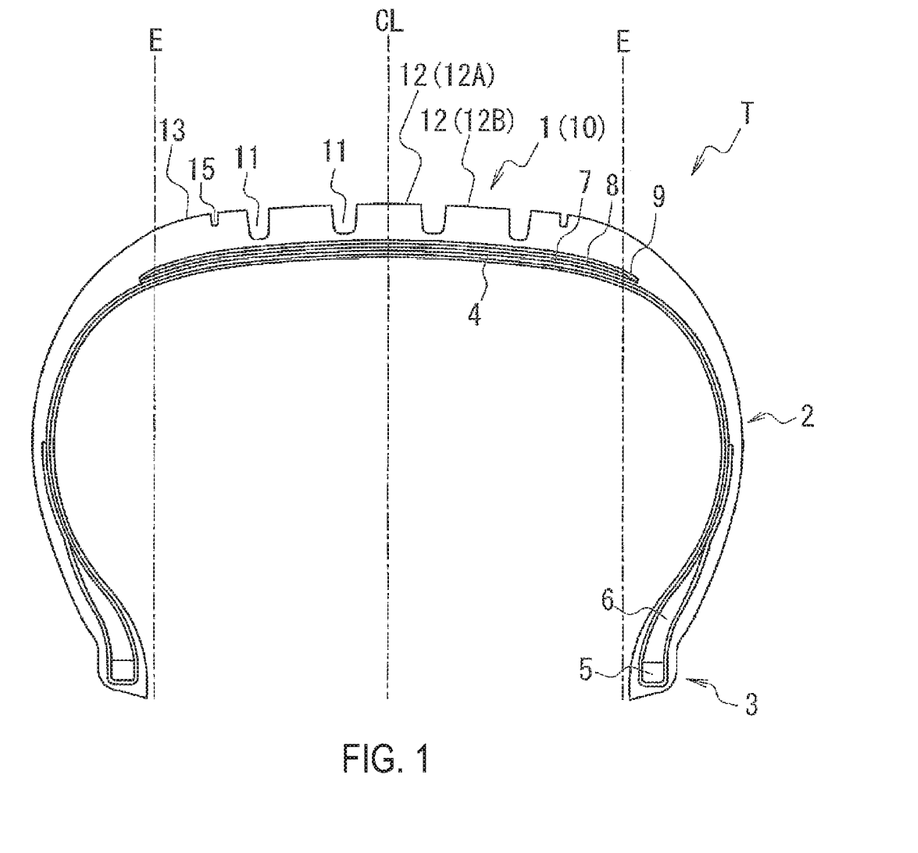
FIG. 1 is a meridian cross-sectional view of a pneumatic tire according to an embodiment of the present technology.

In FIG. 1, the mounting direction of a pneumatic tire T with respect to a vehicle is designated, IN represents the inner side with respect to the vehicle when mounted on the vehicle (hereinafter, referred to as the vehicle inner side), OUT represents the outer side with respect to the vehicle when mounted on the vehicle (hereinafter, referred to as the vehicle outer side), and CL represents the tire equator. The pneumatic tire T includes a tread portion 1, a side wall portion 2, and a bead portion 3. The carcass layer 4 extends between the left-right pair of bead portions 3. The carcass layer 4 includes a plurality of reinforcing cords extending in a tire radial direction, and is folded back around a bead core 5 disposed in each of the bead portions 3 from a tire inner side to a tire outer side. Additionally, a bead filler 6 is disposed on the periphery of the bead core 5, and the bead filler 6 is enveloped by a main body portion and a folded back portion of the carcass layer 4. On the other hand, in the tread portion 1, a plurality of belt layers 7, 8 (two layers in FIG. 1) is embedded on the outer peripheral side of the carcass layer 4. Each of the belt layers 7, 8 includes a plurality of reinforcing cords inclined with respect to the tire circumferential direction, and the reinforcing cords are disposed between the layers intersecting with each other. In the belt layers 7, 8, the inclination angle of the reinforcing cords with respect to the tire circumferential direction is set in the range, for example, of 10° to 40°. In addition, a belt reinforcing layer 9 is provided on the outer circumferential side of the belt layers 7, 8. The belt reinforcing layer 9 includes organic fiber cords oriented in the tire circumferential direction. In the belt reinforcing layer 9, the angle of the organic fiber cords with respect to the tire circumferential direction is set, for example, to from 0° to 5°.

The present technology is applied to such a general pneumatic tire, however, the cross-sectional structure thereof is not limited to the basic structure described above.

Figure 2:
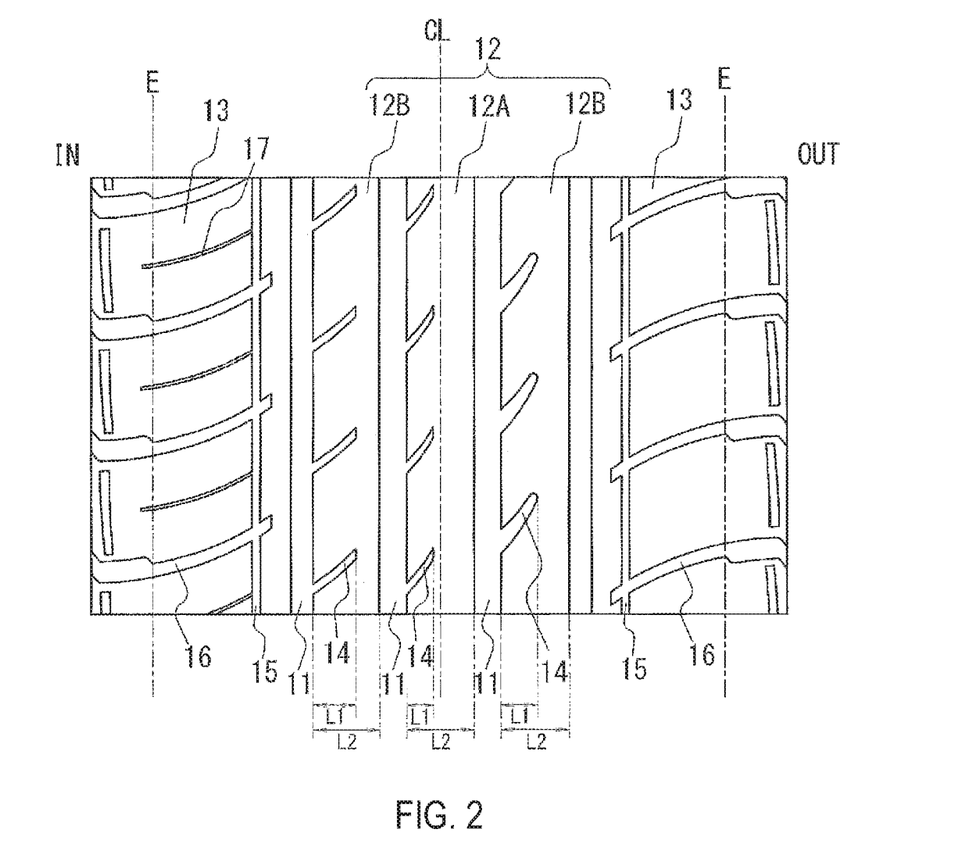
FIG. 2 is a front view illustrating a tread surface of the pneumatic tire according to an embodiment of the present technology.

As illustrated in FIG. 2, a plurality (four in FIG. 2) of main grooves 11 extending in the tire circumferential direction is provided on the outer surface of the tread portion 1, in other words, on a tread surface 10, of the pneumatic tire according to the present technology. The groove width of the main grooves 11 is, for example, from 5 mm to 10 mm, and the groove depth is, for example, from 5 mm to 10 mm. A plurality (three in FIG. 2) of circumferential land portions 12 extending in the tire circumferential direction is partitioned and formed between adjacent main grooves 11. Also, on both sides in the tire width direction of the tire equator CL, shoulder land portions 13 are partitioned and formed between the main grooves 11 on the outermost side in the tire width direction and a ground contact edge E. A plurality of lug grooves 14 is formed at intervals in the tire circumferential direction in the plurality of the circumferential land portions 12, each extending in the tire width direction, communicating with the main groove 11 on the vehicle inner side, not communicating with the main groove 11 on the vehicle outer side, and terminating within the circumferential land portion 12. The groove width of the lug grooves 14 is, for example, from 2 mm to 10 mm, and the groove depth is shallower than that of the main grooves 11, for example from 2 mm to 8 mm.

The lug grooves 14 with such a shape open only to the main groove 11 on the vehicle inner side, and do not open to the main groove 11 on the vehicle outer side, so that the popping sound and pattern noise during traveling is radiated toward the vehicle inner side. Therefore, the external noise is reduced, and it is possible to improve the noise performance. Also, the lug grooves 14 with the shape as described above are formed in all of the circumferential land portions 12, so during traveling on wet road surfaces, rainwater and the like interposed between the land portions and the road surface easily and efficiently flows toward the main grooves 11 on the vehicle inner side, and it is possible to enhance the wet performance. On the other hand, each of the lug grooves 14 terminates within the circumferential land portions, and do not divide the circumferential land portions 12. This results in each of the circumferential land portions 12 having a rib structure extending continuously in the tire circumferential direction, allowing rigidity to be ensured and dry performance to be maintained.

At this time, if grooves with a shape different from that of the lug grooves 14 as described above, in other words, grooves extending in the tire width direction and communicating with both the main groove 11 on the vehicle inner side and the main groove 11 on the vehicle outer side, are formed on the circumferential land portions 12, although the flow of rainwater and the like is improved and the wet performance is improved, the popping sound and the pattern noise during traveling is also radiated to the vehicle outer side, so it is not possible to reduce external noise. Also, the circumferential land portions 12 are divided in the circumferential direction, so the rigidity of the circumferential land portions 12 is reduced, and the dry performance is retarded. Therefore, preferably, only the lug grooves 14 as described above are provided on the circumferential land portions 12.

The lug grooves 14 may terminate within the circumferential land portions 12 as described above, and preferably, the length L1 of the lug groove 14 projected in the circumferential direction may be from 30% to 70% of the width L2 of the circumferential land portion 12. In other words, the interval between the terminating portion of the lug groove 14 and the adjacent main groove 11 to which the lug groove 14 does not communicate is preferably from 30% to 70% of the width of the circumferential land portion 12. If the length L1 is smaller than 30% of the width L2 of the circumferential land portion 12, the lug groove 14 is too small so it is not possible to sufficiently obtain the effect of improving the water drainage performance. If the length L1 is greater than 70% of the width L2 of the circumferential land portion 12, it is difficult to sufficiently ensure the rigidity of the circumferential land portion 12.

Provided at least four main grooves 11 are formed, there is no particular limitation on their number; however, preferably, four main grooves 11 are provided as in the embodiment illustrated in FIG. 2, due to the relationship between the water drainage performance of the grooves and the rigidity of the tread surface. In other words, preferably, three circumferential land portions 12 and one shoulder land portion 13 on each side in the tire width direction (a total of two shoulder land portions 13) are partitioned and formed.

As illustrated in FIG. 2, in the shoulder land portions 13, a circumferential narrow groove 15 extending in the tire circumferential direction and shoulder lug grooves 16 extending in the tire width direction are preferably provided. The circumferential narrow groove 15 is a groove extending in the tire circumferential direction along the main groove 11 on the outermost side in the tire width direction between the main groove 11 on the outermost side in the tire width direction and the ground contact edge E. The groove width and the groove depth of the circumferential narrow grooves 15 are preferably smaller than the groove width and the groove depth of the main grooves 11, for example, the groove width is preferably from 1 mm to 5 mm, and the groove depth is preferably from 2 mm to 8 mm. On the other hand, the shoulder lug grooves 16 have a shape that opens to the circumferential narrow groove 15 and the ground contact edge E, and does not open to the main groove 11. In particular, in the embodiment of FIG. 2, the shoulder lug grooves 16 intersect with the circumferential narrow grooves 15, and terminate within the land portion partitioned and formed between the circumferential narrow groove 15 and the main groove 11 adjacent to the circumferential narrow groove 15 (in other words, the main groove 11 on the outermost side in the tire width direction). A plurality of the shoulder lug grooves 16 is disposed at intervals in the tire circumferential direction. The groove width of the shoulder lug grooves 16 is preferably, for example, from 1 mm to 5 mm, and the groove depth is preferably, for example, from 2 mm to 10 mm.

By providing the circumferential narrow grooves 15 and the shoulder lug grooves 16 with such shapes, the shoulder lug grooves 16 do not communicate with the main grooves 11, so it is possible to prevent air column resonance caused by the main grooves 11 from being radiated to the vehicle outer side through the shoulder lug grooves 16. Also, the groove cross-sectional area of the circumferential narrow groove 15 is smaller than that of the main grooves 11, so the air column resonance caused by the circumferential narrow groove 15 is sufficiently smaller than the air column resonance caused by the main grooves 11, and even though the shoulder lug grooves 16 communicate with the circumferential narrow groove 15, external noise does not become worse. Therefore, it is possible to improve the noise performance. In addition, during traveling on wet road surfaces, it is possible to discharge rainwater and the like interposed between the land portion and the road surface by the circumferential narrow grooves 15 and the shoulder lug grooves 16, and so it is possible to improve wet performance. On the other hand, the land portions are partitioned and formed with a rib structure extending continuously in the tire circumferential direction without being divided by the shoulder lug grooves 16 between the circumferential narrow groove 15 and the main groove 11 adjacent to the circumferential narrow groove 15 (main groove 11 on the outermost side in the tire width direction), so the rigidity of this portion is ensured, and it is possible to improve the dry performance.

The circumferential narrow grooves 15 and the shoulder lug grooves 16 as described above may be formed at least in the shoulder land portion 13 on the vehicle inner side; however, preferably, as illustrated in FIG. 2, they are provided in the shoulder land portions 13 on both sides in the tire width direction.

Regarding the groove area ratio of the circumferential land portions 12 and the shoulder land portions 13, preferably, there is a trend that the groove area ratio of the circumferential land portions 12 on the outer side in the tire width direction is greater than the groove area ratio of the circumferential land portion 12 on the tire equator CL side, and, the groove area ratio of the shoulder land portion 13 is greater than the groove area ratio of the circumferential land portion 12 on the outermost side in the tire width direction. In the embodiment illustrated in FIG. 2, if the circumferential land portion 12 on the tire equator CL is defined as a first circumferential land portion 12A, the circumferential land portions 12 on both sides thereof in the tire width direction defined as second circumferential land portions 12B, the groove area ratio of the first circumferential land portion 12A defined as S1, the groove area ratio of the second circumferential land portions 12B defined as S2, and the groove area ratio of the shoulder land portions 13 defined as S3, then the size relationship of the groove area ratios is preferably S1<S2<S3.

By setting the groove area ratio of the land portions to become smaller toward the tire equator CL side in such a way, it is possible to suppress the increase in sudden cornering force and achieve smoother steering, in other words, it is possible to improve the linearity of steering. If the size relationship of the groove area ratios deviates from the relationship as described above, it will not be possible to sufficiently suppress the increase in cornering force.

In the present technology, the groove area ratio is the proportion of the total area of the lug grooves 14 or circumferential narrow grooves 15 and shoulder lug grooves 16 (and sipes 17 as described below) contained in each land portion (circumferential land portion 12, shoulder land portion 13) with respect to the area of each land portion (circumferential land portion 12, shoulder land portion 13) on the contact patch. Also, the ground contact region is the contact patch formed on a flat plate when a tire is filled with the air pressure corresponding to the maximum load capacity prescribed by JATMA, placed statically in the vertical attitude on the flat plate, and loaded with a load corresponding to 80% of the maximum load capacity.

When shoulder lug grooves 16 are formed in the shoulder land portions 13 on both sides in the tire width direction as illustrated in FIG. 2, in addition, preferably, sipes 17 are formed at least in the shoulder land portion 13 on the vehicle inner side, extending in the tire width direction, opening to the circumferential narrow groove 15 and the ground contact edge E, and not opening to the main groove 11. More preferably, as illustrated in FIG. 2, the sipes 17 are disposed singularly midway between two adjacent shoulder lug grooves 16.

By providing the sipes 17 with such a shape, it is possible to improve the water drainage performance during traveling on wet road surfaces. Also, by providing the sipes 17 on the shoulder land portion 13 on the vehicle inner side in particular, when negative camber is set, the ground contact pressure is increased and the land portion on the vehicle inner side can move more easily, so it is possible to suppress uneven wear.

Note that in the present technology, a sipe 17 is a fine groove with a groove width from 0.6 mm to 1.2 mm and a groove depth from 1 mm to 5 mm.

Preferably, the lug grooves 14 are inclined with respect to the tire circumferential direction, as illustrated in FIG. 2. Preferably, the inclination direction is the same direction for all, regardless of the position on the circumferential land portion 12 that the lug groove 14 is formed. In this case, the inclination angle θ1 of the lug grooves 14 with respect to the tire width direction is preferably, for example, from 15° to 45°. By arranging the lug grooves 14 in such a manner, the flow of water is smooth through the lug grooves 14 when traveling on road surfaces on which the water depth is deep and the like, so the water drainage performance is improved, and it is possible to improve the wet performance.

Preferably, also the shoulder lug grooves 16 are inclined with respect to the tire circumferential direction, as illustrated in FIG. 2. In particular, the inclination direction of the shoulder lug grooves 16 is preferably the same direction as that of the lug grooves 14. In this case, the inclination angle θ2 of the shoulder lug grooves 16 is preferably the same as or smaller than the inclination angle θ1 of the lug grooves 14, for example, from 15° to 30°. By arranging the lug grooves and the shoulder lug grooves in such a manner, the flow of water is smooth through the lug grooves and the shoulder lug grooves when traveling on road surfaces on which the water is deep and the like, so the water drainage performance is improved, and it is possible to improve the wet performance.

EXAMPLES

Twelve types of pneumatic tire were manufactured, Conventional Example 1, Comparative Examples 1 and 2, and Working Examples 1 to 9, with a tire size of 215/45R17 87W, having the cross-sectional shape illustrated in FIG. 1; each having basic tread pattern, presence of circumferential narrow grooves, shape of shoulder lug grooves, groove area ratios of the circumferential land portions (first circumferential land portion, second circumferential land portion on the vehicle inner side, second circumferential land portion on the vehicle outer side) and shoulder land portions (vehicle inner side, vehicle outer side), presence of sipes, inclination direction of lug grooves, and inclination direction of shoulder lug grooves with respect to the inclination direction of lug grooves set respectively as shown in Table 1.

Figure 3:
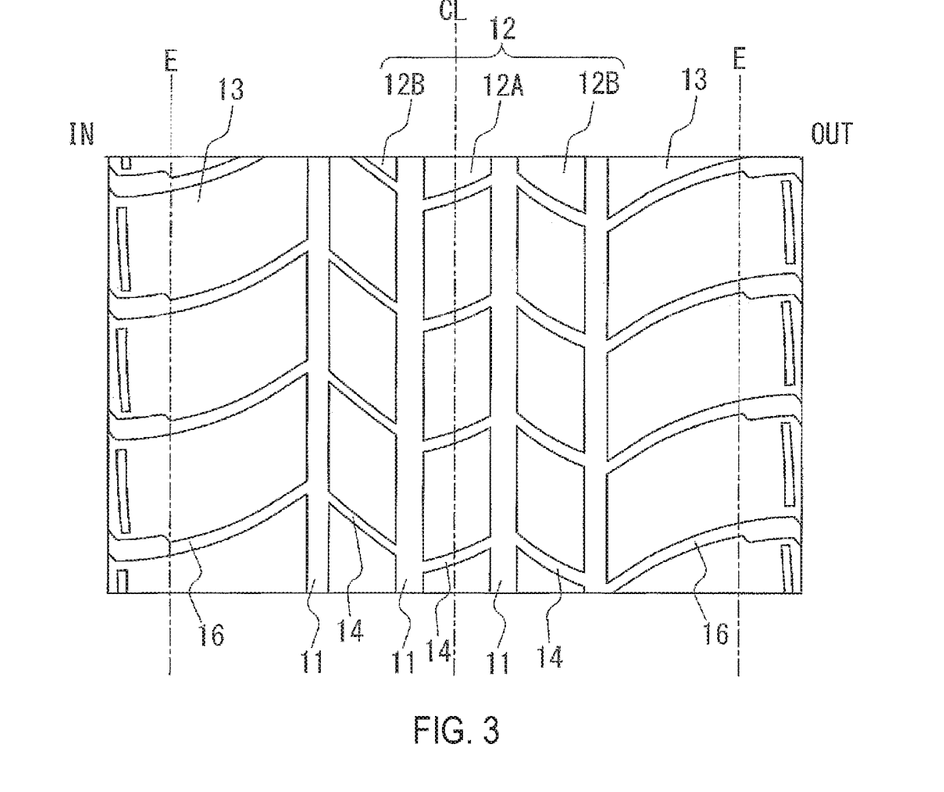
FIG. 3 is a front view illustrating an example of a tread surface of a conventional pneumatic tire.

The pneumatic tire according to Conventional Example 1 was a tire having a tread pattern as illustrated in FIG. 3. Specifically, the tread pattern included four main grooves extending in the tire circumferential direction on the tread surface, with three rows of land portions partitioned and formed between adjacent main grooves. The three rows of land portions were divided in the circumferential direction by a plurality of lug grooves extending in the tire width direction and communicating with the main grooves on both the vehicle inner side and vehicle outer side, thereby forming rows of blocks. Likewise, the shoulder land portions partitioned and formed between the main grooves on the outermost side in the tire width direction and the ground contact edges on both sides in the tire width direction were divided in the circumferential direction by shoulder lug grooves extending in the tire width direction and opening to the main grooves and the ground contact edge, thereby forming rows of blocks. Unlike the tire according to the present technology, circumferential narrow grooves were not formed in the shoulder land portions. Also, as shown in Table 1, the inclination direction of lug grooves varied in each land portion with the inclination direction of lug grooves in adjacent land portions being oriented in opposite directions.

Figure 4:
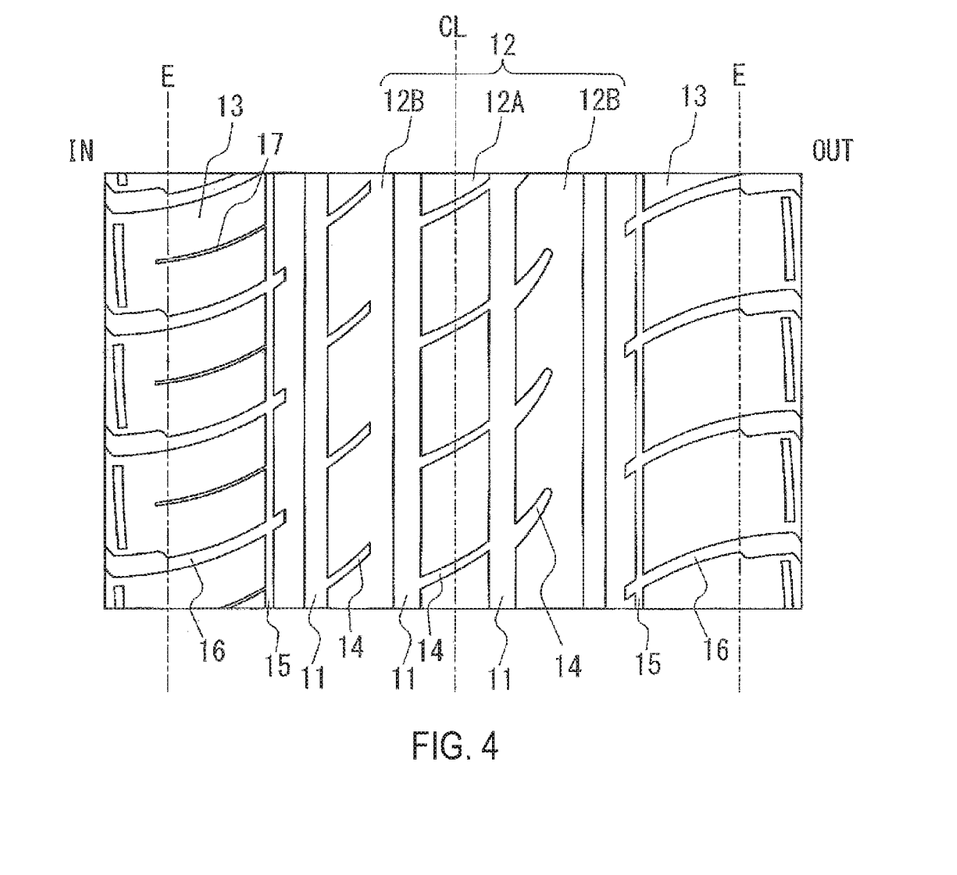
FIG. 4 is a front view illustrating a tread pattern of Comparative Example 1.
Figure 5:
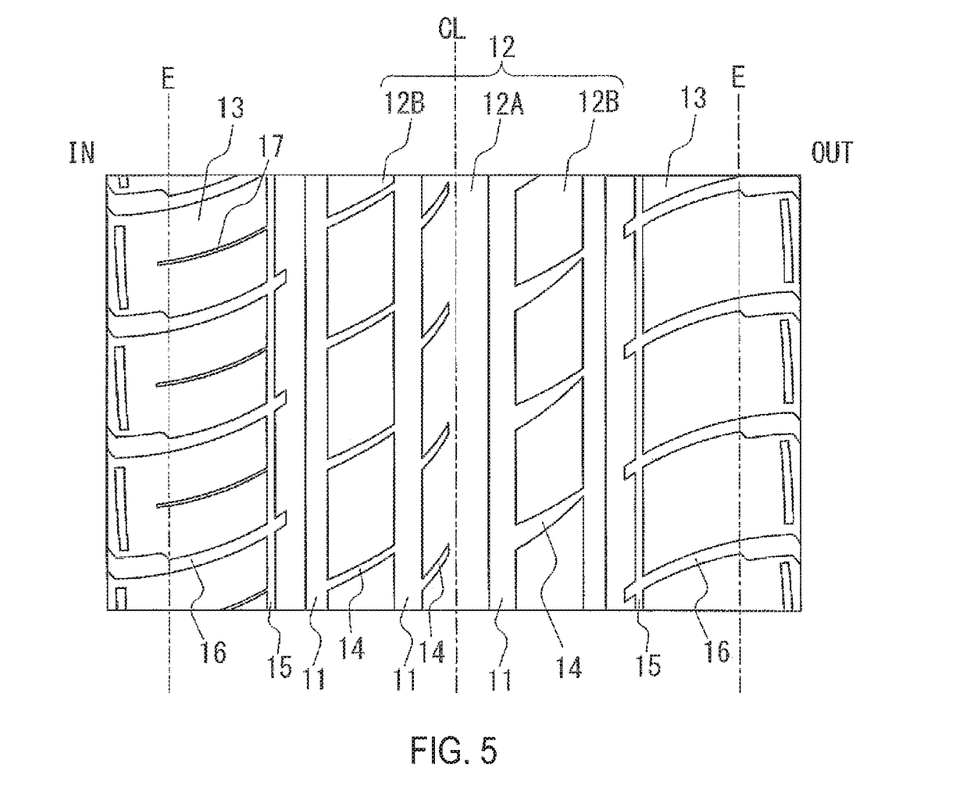
FIG. 5 is a front view illustrating a tread pattern of Comparative Example 2.

Also, as illustrated in FIGS. 4 and 5, the pneumatic tires according Comparative Examples 1 and 2 had a row of blocks with a structure in which the first circumferential land portion or the second circumferential land portions were divided in the circumferential direction by lug grooves formed in either the first circumferential land portion or the second circumferential land portions and communicated with the main groove on the vehicle inner side and the vehicle outer side. Specifically, in the pneumatic tire according to Comparative Example 1 (FIG. 4), the first circumferential land portion is divided in the circumferential direction by lug grooves to form a row of blocks, and in the pneumatic tire according to Comparative Example 2 (FIG. 5), the second circumferential land portions (vehicle inner side and vehicle outer side) are divided in the circumferential direction by lug grooves to form rows of blocks. Apart from these points as described above, the tires according to the Comparative Examples 1 and 2 (FIGS. 4, 5) had the same structure as that of the tire according to Working Example 1 (FIG. 2).

In the row "Lug groove inclination direction" in the table, if the inclination direction of all the lug grooves formed in the first circumferential land portion and second circumferential land portions were the same, it is indicated as "Uniform"; and if the inclination direction of the lug grooves formed in any one of the first circumferential land portion and the second circumferential land portions (vehicle inner side, vehicle outer side) were not the same as the inclination direction of the lug grooves formed in the other circumferential land portions, it is indicated as "Not uniform". Also, in the row "Shoulder lug groove inclination direction", if the inclination direction of all the lug grooves formed in the first circumferential land portion and the second circumferential land portions were the same, and if the inclination of the shoulder lug grooves also have the same direction as the lug grooves, it is indicated as "Uniform", and if the inclination direction is different, it is indicated as "Not uniform".

These 12 types of pneumatic tire were evaluated for noise performance, dry steering stability performance, and wet performance by the evaluation methods described below, and the results are also shown in Table 1.

Noise Performance

Each test tire was assembled on a wheel having a rim size of 17×7J, inflated to an air pressure of 250 kPa, mounted on a test vehicle (front wheel drive vehicle) of displacement volume 1.8 L, and pass-by noise was measured in accordance with a measuring method based on the EEC/ECE tire noise regulations, which correspond to the European pass-by noise regulations. The evaluation results were expressed as an index using the inverse of the measurement value, with Conventional Example 1 being assigned an index value of 100. A greater index value indicates lower pass-by noise and better noise performance.

Dry Steering Stability Performance

Each test tire was assembled on a wheel having a rim size of 17×7J, inflated to an air pressure of 230 kPa, and mounted on a test vehicle (front wheel drive vehicle) of displacement volume 1.8 L. The test vehicle was then driven on a test course with a dry asphalt road surface while varying the speed within the range of 60 km/h to 140 km/h, and sensory evaluation was carried out by three test drivers. The evaluation results were expressed as an index by converting the evaluation points of the sensory evaluation into an index, with Conventional Example 1 being assigned an index value of 100. A greater index value indicates better dry steering stability performance.

Wet Performance

Each test tire was assembled on a wheel having a rim size of 17×7J, inflated to an air pressure of 230 kPa, and mounted on a test vehicle (front wheel drive vehicle) of displacement volume 1.8 L. The test vehicle was then driven on a test course with an asphalt road surface with a water depth from 2 mm to 3 mm while varying the speed within the range of 40 km/h to 80 km/h, and sensory evaluation was carried out by three test drivers. The evaluation results were expressed as an index by converting the evaluation points of the sensory evaluation into an index, with Conventional Example 1 being assigned an index value of 100. A greater index value indicates better wet steering stability performance.

TABLE 1

|  |  |  | Conventional Example 1 | Comparative Example 1 | Comparative Example 2 | Working Example 1 | Working Example 2 |
|---|---|---|---|---|---|---|---|
| Basic tread pattern |  |  | FIG. 3 | FIG. 4 | FIG. 5 | FIG. 2 | FIG. 2 |
| Presence of circumferential narrow grooves |  |  | Absent | Present | Present | Present | Absent |
| Shoulder lug grooves | Open to main grooves |  | Open | Closed | Closed | Closed | Closed |
|  | Open to circumferential narrow grooves |  | — | Open | Open | Open | — |
|  | Open to ground contact edge |  | Open | Open | Open | Open | Open |
| Groove area ratio | First circumferential land portion (%) |  | 10 | 10 | 8 | 8 | 8 |
|  | Second circumferential land portion (%) | Vehicle inner side | 12 | 10 | 11 | 10 | 10 |
|  |  | Vehicle Outer Side | 12 | 14 | 15 | 14 | 14 |
|  | Shoulder land portion (%) | Vehicle inner side | 15 | 19 | 19 | 19 | 17 |
|  |  | Vehicle Outer Side | 15 | 17 | 17 | 17 | 15 |
| Presence of sipes |  |  | Absent | Present | Present | Present | Present |
| Lug groove inclination direction |  |  | Not uniform | Uniform | Uniform | Uniform | Uniform |
| Shoulder lug groove inclination direction |  |  | — | Uniform | Uniform | Uniform | Uniform |
| Noise performance index value |  |  | 100 | 104 | 103 | 110 | 113 |
| Dry Steering Stability Performance index value |  |  | 100 | 103 | 104 | 110 | 113 |
| Wet performance index value |  |  | 100 | 112 | 113 | 110 | 107 |

|  |  |  | Working Example 3 | Working Example 4 | Working Example 5 | Working Example 6 | Working Example 7 | Working Example 8 | Working Example 9 |
|---|---|---|---|---|---|---|---|---|---|
| Basic tread pattern |  |  | FIG. 2 | FIG. 2 | FIG. 2 | FIG. 2 | FIG. 2 | FIG. 2 | FIG. 2 |
| Presence of circumferential narrow grooves |  |  | Present | Present | Present | Present | Present | Present | Present |
| Shoulder lug grooves | Open to main grooves |  | Open | Closed | Closed | Closed | Closed | Closed | Closed |
|  | Open to circumferential narrow grooves |  | Open | Closed | Open | Open | Open | Open | Open |
|  | Open to ground contact edge |  | Open | Open | Closed | Open | Open | Open | Open |
| Groove area ratio | First circumferential land portion (%) |  | 8 | 8 | 8 | 8 | 8 | 8 | 8 |
|  | Second circumferential land portion (%) | Vehicle inner side | 10 | 10 | 10 | 14 | 10 | 10 | 10 |
|  |  | Vehicle Outer Side | 14 | 14 | 14 | 18 | 14 | 14 | 14 |
|  | Shoulder land portion (%) | Vehicle inner side | 18 | 18 | 18 | 12 | 18 | 19 | 19 |
|  |  | Vehicle Outer Side | 16 | 16 | 16 | 14 | 16 | 17 | 17 |

TABLE 1-continued

| Presence of sipes | Present | Present | Present | Present | Absent | Present | Present |
|---|---|---|---|---|---|---|---|
| Lug groove inclination direction | Uniform | Uniform | Uniform | Uniform | Uniform | Not uniform | Uniform |
| Shoulder lug groove inclination direction | Uniform | Uniform | Uniform | Uniform | Uniform | — | Not uniform |
| Noise performance index value | 107 | 115 | 115 | 113 | 111 | 110 | 110 |
| Dry Steering Stability Performance index value | 107 | 112 | 112 | 105 | 113 | 110 | 110 |
| Wet performance index value | 113 | 106 | 105 | 107 | 107 | 107 | 105 |

As can be seen from Table 1, each of Working Examples 1 to 9 has improved noise performance and dry steering stability performance compared with Conventional Example 1, while maintaining a high level of wet performance.

On the other hand, in the case of Comparative Examples 1 and 2, in which either the lug grooves formed in the first circumferential land portion or the lug grooves formed in the second circumferential land portions open to the main grooves on the vehicle inner side and the vehicle outer side, almost no effect of improving the noise performance, the dry steering stability performance, and the wet steering stability was obtained.

What is claimed is:

1. A pneumatic tire comprising:
   at least four main grooves extending in a tire circumferential direction on a tread surface;
   at least three circumferential land portions partitioned and formed extending in the tire circumferential direction between adjacent main grooves of the at least four main grooves;
   shoulder land portions partitioned and formed between outermost main grooves, of the at least four main grooves, on outermost sides in a tire width direction and ground contact edges on both sides in the tire width direction; and
   designation of a mounting direction with respect to a vehicle;
   a plurality of lug grooves being formed at intervals in the tire circumferential direction in each of the at least three circumferential land portions, extending in the tire width direction, communicating with a first set of main grooves only on an inner side of the at least three circumferential land portions with respect to the vehicle when mounted on the vehicle, not communicating with a second set of main grooves on an outer side of the at least three circumferential land portions with respect to the vehicle when mounted on the vehicle, the first set of main grooves including at least three of the at least four main grooves, the second set of main grooves including at least three of the at least four main grooves, the second set of main grooves including at least two main grooves of the first set of main grooves, and terminating within the circumferential land portion;
   circumferential narrow grooves being formed extending in the shoulder land portions on both sides in the tire circumferential direction, the circumferential narrow grooves having a groove width of from 1.6 to 5 mm and a groove depth of from 4 mm to 8 mm;
   shoulder lug grooves being formed at intervals in the tire circumferential direction extending in the tire width direction in a ground contact area of the shoulder land portions on both sides in the tire width direction, opening to the circumferential narrow groove and the ground contact edge, and not opening to the at least one of the main grooves, the shoulder lug grooves having a groove width of from 1.6 to 5 mm; and
   sipes being formed at least on the shoulder land portion on the inner side with respect to the vehicle when mounted on the vehicle, extending in the tire width direction, opening to the circumferential narrow groove and the ground contact edge, and not opening to the at least one of the main grooves;
   wherein sipes are not formed in the at least three circumferential land portions and the at least three circumferential land portions include only lug grooves opening to the inner side.

2. The pneumatic tire according to claim 1, wherein only the plurality of lug grooves are formed in each of the circumferential land portions.

3. The pneumatic tire according to claim 1, wherein, at least in the shoulder land portion on the outer side with respect to the vehicle when mounted on the vehicle, a circumferential narrow groove is formed extending in the tire circumferential direction and shoulder lug grooves are formed at intervals in the tire circumferential direction extending in the tire width direction, opening to the circumferential narrow groove and the ground contact edge, and not opening to the at least one of the main grooves.

4. The pneumatic tire according to claim 1, wherein a groove area ratio of the circumferential land portions on the outer side in the tire width direction is greater than a groove area ratio of the circumferential land portion on a tire equator side, and a groove area ratio of the shoulder land portions is greater than the groove area ratio of the circumferential land portions on the outermost side in the tire width direction.

5. The pneumatic tire according to claim 1, wherein each of the plurality of lug grooves is inclined in the same direction with respect to the tire circumferential direction.

6. The pneumatic tire according to claim 1, wherein the shoulder lug grooves are inclined in the same direction as the plurality of lug grooves.

7. The pneumatic tire according to 2, wherein, at least in the shoulder land portion on the outer side with respect to the vehicle when mounted on the vehicle, a circumferential narrow groove is formed extending in the tire circumferential direction and shoulder lug grooves are formed at intervals in the tire circumferential direction extending in the tire width direction, opening to the circumferential narrow groove and the ground contact edge, and not opening to the at least one of the main grooves.

8. The pneumatic tire according to claim 2, wherein a groove area ratio of the circumferential land portions on the outer side in the tire width direction is greater than a groove area ratio of the circumferential land portion on a tire equator side, and a groove area ratio of the shoulder land portions is greater than the groove area ratio of the circumferential land portions on the outermost side in the tire width direction.

9. The pneumatic tire according to claim 2, wherein, in the shoulder land portions on both sides in the tire width direction, circumferential narrow grooves are formed extending in the tire circumferential direction and shoulder lug grooves are formed at intervals in the tire circumferential direction extending in the tire width direction, opening to the circumferential narrow groove and the ground contact edge, and not opening to the at least one of the main grooves; and sipes are formed at least on the shoulder land portion on the inner side with respect to the vehicle when mounted on the vehicle, extending in the tire width direction, opening to the circumferential narrow groove and the ground contact edge, and not opening to the at least one of the main grooves.

10. The pneumatic tire according to claim 2, wherein each of the plurality of lug grooves is inclined in the same direction with respect to the tire circumferential direction.

11. The pneumatic tire according to claim 2, wherein the shoulder lug grooves are inclined in the same direction as the plurality of lug grooves.

12. The pneumatic tire according to claim 3, wherein a groove area ratio of the circumferential land portions on the outer side in the tire width direction is greater than a groove area ratio of the circumferential land portion on a tire equator side, and a groove area ratio of the shoulder land portions is greater than the groove area ratio of the circumferential land portions on the outermost side in the tire width direction.

13. The pneumatic tire according to claim 3, wherein each of the plurality of lug grooves is inclined in the same direction with respect to the tire circumferential direction.

14. The pneumatic tire according to claim 3, wherein the shoulder lug grooves are inclined in the same direction as the plurality of lug grooves.

15. The pneumatic tire according to claim 4, wherein each of the plurality of lug grooves is inclined in the same direction with respect to the tire circumferential direction.

16. The pneumatic tire according to claim 4, wherein the shoulder lug grooves are inclined in the same direction as the plurality of lug grooves.

17. The pneumatic tire according to claim 1, wherein the plurality of lug grooves in the at least three circumferential land portions terminate within the circumferential land portions without intersecting other of the lug grooves, wherein each of the lug grooves are defined by a single, continuous groove wall.

18. The pneumatic according to claim 1, wherein the circumferential narrow grooves are positioned closer to the outermost main grooves than to the ground contact edges.

* * * * *